United States Patent [19]

Lin et al.

[11] 3,780,312

[45] Dec. 18, 1973

[54] THRESHOLD LOGIC USING MAGNETIC BUBBLE DOMAINS

[75] Inventors: Yeong S. Lin, Mount Kisco; Ying L. Yao, Mahopac, both of N.Y.

[73] Assignee: International Business Machines Corporation, Armonk, N.Y.

[22] Filed: Dec. 30, 1971

[21] Appl. No.: 214,147

[52] U.S. Cl.307/88 LC, 340/174 EB, 340/174 PM, 340/174 QA, 340/174 TF

[51] Int. Cl. .................... H03k 19/168, G11c 11/14

[58] Field of Search ................ 340/174 TF, 174 EB; 307/88 LC

[56] References Cited

UNITED STATES PATENTS

| | | | |
|---|---|---|---|
| 3,234,401 | 2/1966 | Dinman | 307/88 LC |
| 3,676,871 | 7/1972 | Copeland | 340/174 TF |
| 3,619,636 | 11/1971 | Chow | 340/174 TF |

OTHER PUBLICATIONS

IEEE Spectrum, May 1971, pg. 32–39.

*Primary Examiner*—James W. Moffitt
*Attorney*—Jackson E. Stanland et al.

[57] ABSTRACT

A threshold logic device is provided using magnetic bubble domains. The presence and absence of bubble domains are the logic inputs to the device and the logic gate itself is comprised of a plurality of series connected sensing elements. Magnetoresistive sensing devices are particularly suitable. Each sensing element is given a particular geometry or thickness in order to achieve weighting of the logic inputs. The threshold of the device is internal in an associated detector and can be varied by changing the measuring current through the sensing elements in the case of magnetoresistive sensing elements. Depending on the sum of the weighted inputs being at least equal to the threshold value, or less than this value, the binary output of the device will be one or zero, respectively.

28 Claims, 6 Drawing Figures

THRESHOLD LOGIC USING MAGNETIC BUBBLE DOMAINS

BACKGROUND OF THE INVENTION

1. Field of the Invention

This invention relates to threshold logic and in particular to threshold logic devices using magnetic bubble domains.

2. Description of the Prior Art

Threshold logic is known as can be seen by referring to an article by D. Hampel et al., appearing in the IEEE Spectrum, May 1971, at pages 32–39. This article provides the basic theory of threshold logic and illustrates various circuit and device configurations for achieving various logic functions.

Conventional threshold logic is implemented by using either current summing involving several current sources and a threshold detector, or by magnetic flux summing techniques. Current summing techniques require several electronic networks and many current sources to provide the necessary inputs. Therefore, a large area is required on a semiconductor chip to provide a threshold logic device using current summing. With this type of threshold logic adjustment of the various weighting factors is difficult, since precise diffusion processes are required for fabrication of the resistive elements.

Magnetic flux summing techniques use magnetic cores which have several control windings each with an appropriate number of turns thereon. The number of turns determines the weighting function while the threshold of the device is determined by the hysteresis characteristics of the magnetic cores. Threshold logic using cores requires large areas, and is slow in logic speed.

This invention proposes the use of magnetic bubble domains as inputs to a threshold logic device comprising a plurality of bubble domain sensing elements which are responsive to the domains. As such, this differentiates from other logic devices using bubble domains, wherein interactions between domains forms the basis of the logic operation. For instance, various logical connectives using magnetic bubble domains are shown in the IBM Technical Disclosure Bulletin: Vol. 13, No. 6, December 1970, page 2053; Vol. 13, No. 6, November 1970, page 1581; Vol. 13, No. 10, March 1971, page 2992; Vol. 13, No. 10, March 1971, page 3068.

Prior art threshold logic configurations have disadvantages, including multiple current source requirements, sensitivity to external noise, difficult adjustment of input weighting factors and thresholds, and requirements for large areas for fabrication.

Accordingly, it is an object of this invention to provide an improved threshold logic device using magnetic bubble domains.

It is another object of this invention to provide an improved threshold logic device using bubble domains which has the capability of easy adjustment of input weighting factors and of decision threshold.

It is a further object of this invention to provide an improved threshold logic device having high speed and which requires only a minimum number of current sources.

It is a still further object of this invention to provide an improved threshold logic device which is insensitive to external noise and can be fabricated as a monolithic integrated structure.

A still further object of this invention is to provide a threshold logic device using magnetic bubble domains which requires only a small area.

BRIEF SUMMARY OF THE INVENTION

A novel bubble domain logic circuit is described which does not use interactions between adjacent bubble domains to provide logical functions. Instead, threshold logic is used in which the logic inputs are bubble domains. If the sum of the weighted inputs is at least equal to the threshold, the output of the logic device will be one. If the sum of the weighted inputs is less than the threshold, the output will be zero.

With bubble domains as logic inputs, threshold logic is provided by a plurality of sensing elements, each of which is responsive to a magnetic bubble domain logic input. Generally, the sensing elements can be varied in some way to provide a weighting capability. In a preferred embodiment, magnetoresistive sensing elements are series connected to provide a logic gate. The geometry and/or thickness of these elements can be changed to change the weighting of the logic inputs. In addition, the internal decision threshold is changed by varying the current through the magnetoresistive sensing elements.

The output voltage developed across the logic gate is an input to a threshold detector and a binary one output is produced by the detector if the threshold is exceeded. If the threshold is not exceeded, a binary zero is provided.

Accordingly, in the preferred embodiment magnetic bubble domains are the logic inputs which are propagated to the logic gate by any of the known propagation means, including permalloy patterns or conductors. The logic gate is comprised of series connected magnetoresistive sensing elements which have a fixed current flowing through them. This current can be changed in order to change the decision threshold of the logic device. The weighting factor for each input is adjusted by adjusting the geometry and/or thickness of the associated magnetoresistive sensing element. For instance, if all sensing elements have the same thickness and width, one which has a length twice that of the others will have a weighting factor of two relative to the weighting factors (1) of the other sensing elements.

The total voltage developed across all of the magnetoresistive sensing elements is summed and applied to a threshold detector which provides a binary one output if the threshold is equalled or exceeded. When the threshold is not exceeded, the binary output is zero.

As an alternative, the threshold logic device can be a combination of a voltage source and a current threshold detector. In this case, the threshold of the device can be adjusted by varying the voltage magnitude from the voltage source.

This threshold device consumes low power and can be mass fabricated in a simple manner. It operates at high speed and uses only a single current source which eliminates all the tolerance problems associated with multi-current sources. Further, it is relatively insensitive to external electrical noises.

The foregoing and other objects, features, and advantages of the invention will be apparent from the following more particular description of the preferred embodiments of the invention as illustrated in the accompanying drawings.

DETAILED DESCRIPTION OF THE PREFERRED EMBODIMENTS

Before proceeding to the description of a bubble domain embodiment for a threshold logic device, it is constructive to first consider threshold logic devices. These devices are described in the aforementioned article by Hampel et al. As can be appreciated from this article, threshold logic has a greater capability than conventional logic. This includes a very large saving in the number of logic gates and an increase in speed. For example, it can be shown that a three input logic gate can implement 104 functions out a total possible 256 functions (i.e., $2^{2^n}$ combinations of Boolean functions in terms of $n$=3 binary variables).

A threshold logic gate has binary inputs and outputs the same as other logic gates. However, in a threshold logic gate the inputs are weighted and a binary decision is made as to whether the total weight is more or less than some reference, which is defined as the threshold of the circuit. This concept of weighting the inputs and summing them rather than simply noting the presence of the inputs as high or low is the reason that a threshold gate provides more information about the state of the inputs than conventional logic gates.

Figure 1:
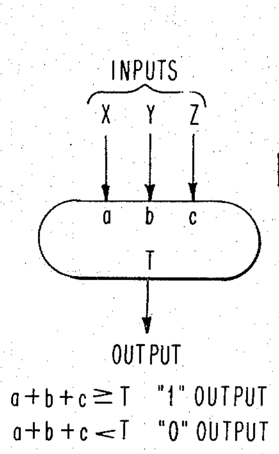
FIG. 1 is a schematic diagram of a threshold logic circuit having a plurality of inputs and a single binary output.

FIG. 1 shows a representation of a threshold logic gate having three binary inputs X, Y, and Z. It should be realized that any number of logic inputs can be provided. Each of these inputs has a weighting factor $a$, $b$, $c$, respectively. The internal threshold of the circuit is designated T.

In general, the threshold of an $n$-input gate can be anywhere between 1 and $n$, the former case being equivalent to an OR gate and the latter being equivalent to an AND gate. The special case where the threshold T is given by the expression $(n+1)/2$ is referred to as a majority gate. For instance, if the input weighting factors $a$, $b$, and $c$ are all 1 and the threshold T is 2, the threshold logic gate of FIG. 1 will be a majority gate. This means that a binary 1 output will be achieved only when two or more inputs are present (i.e., when these inputs are in a "1" state). This threshold logic majority gate provides a function that would normally require 3 or 4 conventional Boolean gates, thereby representing the simplicity and economy of threshold logic.

As can be seen by referring to FIG. 1, a binary 1 output occurs when the sum of the weighting factors $a+b+c$ (all inputs equal one) is at least equal to the threshold value. When the sum of these weighting factors is less than the threshold, a binary 0 output results.

Figure 2:
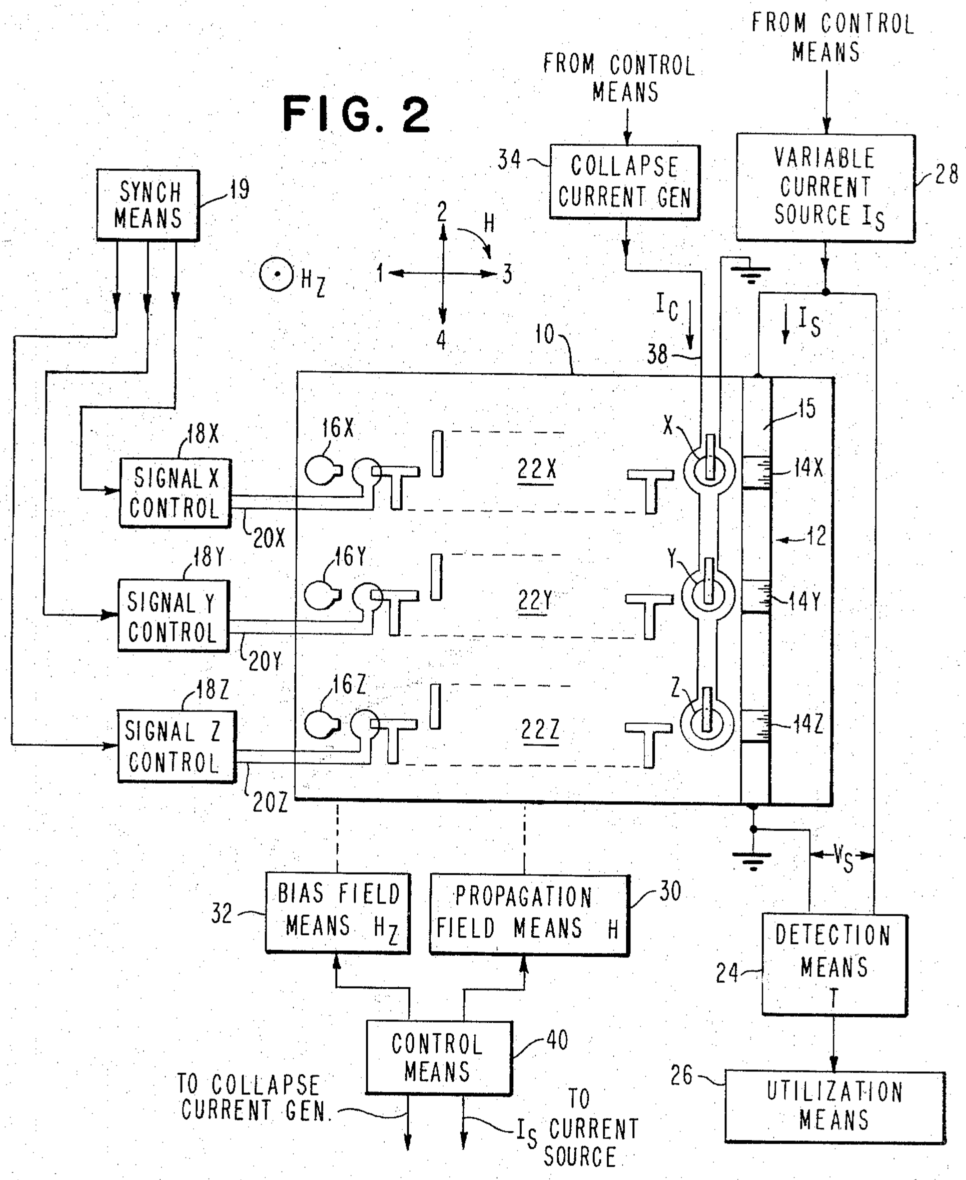
FIG. 2 is a magnetic bubble domain embodiment for a threshold logic device as illustrated in FIG. 1.

FIG. 2 shows an embodiment of a threshold logic gate using bubble domains. This gate uses three binary inputs in the manner shown in FIG. 1, although it should be understood that any number of binary inputs can be provided. In more detail, a magnetic sheet 10, such as garnet or orthoferrite has located thereon a threshold logic gate, generally indicated by the reference numeral 12. Threshold gate 12 is comprised of series connected magnetoresistive sensing elements 14X, 14Y, and 14Z. These sensing elements can be comprised of any magnetoresistive material, for instance permalloy. They are electrically connected in series by the conductor 15 which could be, for instance, copper or gold.

The logic inputs to threshold logic gate 12 are the bubble domains X, Y, and Z. These are provided by permalloy bubble domain generators 16X, 16Y, and 16Z. These generators are well known in the art, and reference is made to U. S. Pat. No. 3,555,527. Associated with each bubble domain generator is a signal control 18X, 18Y, and 18Z. These control units provide currents to loops 20X, 20Y, and 20Z respectively in order to collapse domains when "0" logic inputs are to be provided to the appropriate sensing elements 14X, 14Y or 14Z.

A synchronization means 19 is connected to the signal controls 18X, 18Y and 18Z in order to provide the logical inputs to the threshold gate 12 at the same time. The synchronization means is a standard electrical control circuit which provides clock pulses to trigger the various signal control means 18X, 18Y, and 18Z at the same time.

The bubble domain inputs are propagated to threshold logic device 12 by conventional propagation means such as permalloy T and I bars. For instance, propagation means 22X is associated with domain generator 16X, propagation means 22Y is associated with domain generator 16Y, and propagation means 22Z is associated with domain generator 16Z. Of course, it is understood that while T and I bar propagation means are shown, other types of propagation means, such as conductor patterns and angelfish patterns, can be used. Also, while domain generators are shown for provision of the logic inputs, it should be understood that the bubble domains (or absence of domains) constituting the logic inputs can be provided from another stage of logic or from a memory circuit, or in general from any other type of bubble domain circuit.

The next part of the overall threshold logic device is the detection means 24, which has an internal threshold T. The detection means 24 is a conventional electrical circuit which provides a high output if a certain threshold is met. That is, depending upon the voltage signal $V_s$ generated across the threshold logic gate 12, a binary 1 or binary 0 output will be provided from the detection means 24 to the utilization means 26. This utilization means can be any means responsive to the electrical binary output of detection means 24.

The threshold logic gate 12 has a measuring current $I_s$ flowing through it which is provided by variable current source 28. Generally, a d.c. current level is applied through the magnetoresistive sensors 14X, 14Y, and 14Z when the logic inputs are present in flux-coupling relationship to the sensing elements. The magnitude of the current $I_s$ is variable so that the threshold T of the logic device can be changed.

The weighting functions of the logic gate 12 are provided by the geometry and/or thickness of the magnetoresistive sensing elements. For instance, for sensing elements of the same thickness and width, the resistance of the element varies linearly with the length of the element. Therefore, to double the weighting factor of a particular logic input, it is only necessary to make the length of the sensing element associated with that logic input twice that of the other sensing elements.

The bubble domains X, Y, and Z are propagated to flux-coupling proximity to the associated sensing element by the various propagation means 22X, 22Y, and 22Z, respectively. These propagation means create sequential attractive magnetic poles in response to the rotation of an in-plane magnetic field H which is provided by the propagation field means 30. Propagation field means 30 is conventionally well known and can be provided by current carrying coils surrounding magnetic sheet 10.

A bias field $H_z$ is provided normal to magnetic sheet 10 for stabilizing the diameter of the magnetic bubble domains in sheet 10. This bias field is provided by bias field means 32 which can be a current carrying coil providing a magnetic field normal to sheet 10. Of course, other well known alternatives exist, such as a permanent magnet or a magnetic layer exchange coupled to sheet 10.

After the presence of the logic inputs has been sensed by the magnetoresistive sensing elements, the logic inputs are destroyed by the magnetic field due to current $I_c$. This current is provided by the collapse current generator 34 and propagates in conductor loop 38. Loop 38 has wide portions located in the vicinity of the sensing elements. A magnetic field created by current $I_c$ within these wide portions destroys the bubble domains after they are sensed by the associated sensing element.

A control means 40 is provided to synchronize the operation of the various components in this device. For instance, the bias field means 32 and propagation field means 30 are controlled to provide the bias field $H_z$ and the propagation field H. Also, control means 40 triggers the variable current source 28 to provide current $I_s$ when the logic inputs X, Y, and Z are present in a position which provides flux-coupling to the associated sensing element 14X, 14Y, and 14Z, respectively. Control means 40 also triggers collapse current generator 34 to provide current $I_c$ to destroy the logic inputs after they are sensed by the threshold logic gate 12.

The operation of the logic gate 12 will now be explained in more detail. As is shown by referring to copending application Ser. No. 78,531, filed Oct. 6, 1970, (now U.S. Pat. No. 3,691,540) in the name of G. S. Almasi et al., and assigned to the present assignee, magnetoresistive sensing of bubble domains provides a very advantageous means of detection. The magnetoresistive sensing elements are responsive to the stray field of magnetic bubble domains which are in flux-coupling proximity to the sensing elements. This causes a rotation of the magnetization vector of each sensing element which in turn leads to a change in resistance of the sensing element. If a constant current is flowing through the sensing element, a change in resistance of the element will be manifested as a change in voltage across the element. Correspondingly, if a constant voltage source is impressed across the sensing element, a current change will result when the resistance of the element changes depending upon the presence or absence of a bubble domain in flux-coupling proximity to the element.

Figure 3:
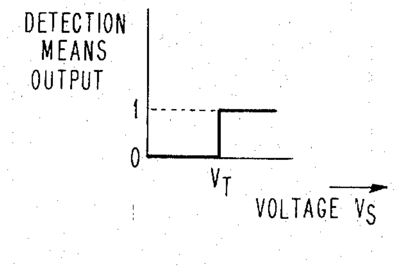
FIG. 3 is a plot of the binary output of the threshold logic device of FIG. 2, as a function of the voltage developed across the sensing elements of that device.

Applying the discussion in the preceding paragraph, it is readily apparent that the various logic inputs X, Y, and Z will provide voltage changes across the associated magnetoresistive sensing element 14X, 14Y, and 14Z, respectively. The total voltage developed across logic gate 12 will be the signal $V_s$. If this is at least equal to the internal threshold of detection means 24, a binary 1 output will be delivered to the utilization means 26. This is shown in FIG. 3 which plots the detection means output as a function of the voltage $V_s$. From this plot it can be seen that when the voltage $V_s$ equals the threshold voltage $V_t$ of detection means 24, a binary 1 output will be provided.

If the embodiment of FIG. 2 is to be used as a majority logic gate, the threshold T of the detection means 24 will be 2 and each binary input will be rated 1. In this case, the geometry and thickness of each magnetoresistive sensing element 14X, 14Y and 14Z will be identical. If at least two of the logic inputs X, Y, and Z are present, a binary 1 output will be provided by detection means 24.

Figures 4, 5:
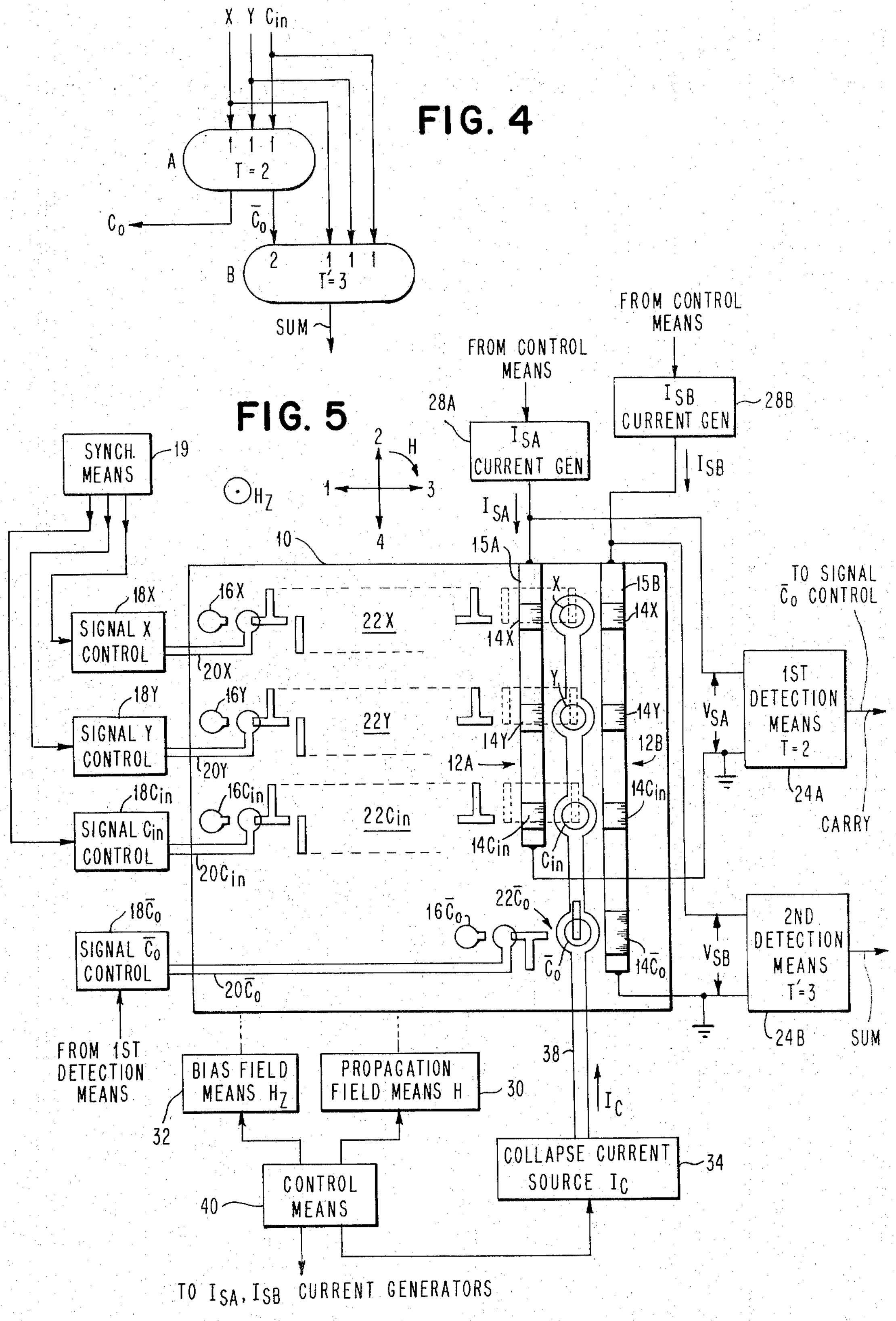
FIG. 4 is a threshold gate realization of a full adder circuit.
FIG. 5 is one embodiment of the full adder circuit of FIG. 4 using magnetic bubble domains.

FIG. 2 was used to illustrate a threshold logic gate in a bubble domain environment. FIG. 4 shows a circuit using a plurality of threshold logic devices. In this diagram, the circuit is a full adder circuit, which is well known in logic circuitry. In FIG. 4, a first threshold logic device A is provided in which the various logic inputs X, Y, and $C_{in}$ are each weighted 1. The internal threshold T of logic device A is 2.

The second threshold logic device B is provided with four logic inputs. Three of these logic inputs are the same as those applied to threshold logic device A while the fourth logic input is an inverted output ($\overline{C}_o$) of threshold device A. The fourth logic input as a weight of 2 in threshold device B. A second output is provided from logic device A and is the invert of carry output $C_o$ which is applied to the next stage of the overall circuit. The logic input $C_{in}$ is the carry-in input from the previous stage of this adder. Finally, the output of threshold logic device B is the sum.

FIG. 5 shows one embodiment of a full adder circuit in accordance with the diagram of FIG. 4. To the extent possible, the same reference numerals will used to describe the circuit of FIG. 5 as were used to describe the circuit of FIG. 2. However, the numerals will be associated with inputs labelled as X, Y, $C_{in}$ and $C_o$. For instance, a domain generator used to provide logic input X will be designated 16X.

In FIG. 5, the logic inputs X, Y, and $C_{in}$ are provided by magnetic bubble domain generators 16X, 16Y, and 16$C_{in}$. These generators have associated with them signal control means 18X, 18Y, and 18$C_{in}$. The various control means 18 are connected to a synchronization means 19 in order that they operate at the same time. The signal control means 18X, 18Y, and 18$C_{in}$ provide current in conductor loops 20X, 20Y, and 20$C_{in}$, respectively. These currents create magnetic fields used to collapse domains provided by the associated domain generator when the logical input is to be a binary 0.

In a corresponding way, the logical input $\overline{C}_o$ is provided by domain generator 16$\overline{C}_o$. Associated with this generator is a signal control means 18$\overline{C}_o$ which provides current through conductor loop 20$\overline{C}_o$. To provide the inverted signal $\overline{C}_o$, control means 18$\overline{C}_o$ is oppositely poled to the control means 18X, 18Y, and 18$C_{in}$. This means that if $+C_o$ is received from gate 12A, the input to gate 13 is $\overline{C}_o$. In order to provide input $\overline{C}_o$ to gate 12B at the same time that inputs X, Y, and $C_{in}$ arrive at this gate, generator 16$\overline{C}_o$ is located close to gate 12B.

Propagation of domains to flux-coupling proximity to threshold logic gates 12A and 12B is provided by the propagation means 22X, 22Y, 22$C_{in}$, and 22$\overline{C}_o$. Because the domains have to propagate beneath logic gate 12B, each propagation means 22X . . . 22$\overline{C}_o$ has a portion comprised of permalloy T and I bars deposited beneath magnetic sheet 10. The portion of the various propagation means located beneath magnetic sheet 10 is indicated in dashed lines.

Domains created in magnetic sheet 10 have their diameters stabilized by the magnetic bias field $H_z$ produced by bias field means 32. The propagation means 22X . . . 22$\overline{C}_o$ provide attractive poles for the domains in response to the rotating propagation field H. This field is provided by propagation field means 30.

In order that the various logic inputs X, Y, $C_{in}$, and $\overline{C}_o$ act on logic gates 12A and 12B and then get collapsed, these logic inputs are propagated to positions between these two logic gates. Since the logic inputs X, Y, and $C_{in}$ are to be sensed by gate 12A prior to being sensed by gate 12B, these logic inputs are sensed by gate 12A when they are located to the left of gate 12A (or are passing below it). These inputs are then sensed by gate 12B when they are located between gates 12A and 12B. After being sensed by logic gate 12B, current $I_c$ is produced by collapse current source 34. This current propagates in conductor loop 38 and causes a magnetic field which aids the bias field $H_z$, thereby collapsing the logic inputs X, Y, $C_{in}$, and $\overline{C}_o$.

Each logic gate 12A and 12B is comprised of series connected magnetoresistive sensing elements whose resistance changes in response to the presence and absence of binary logic inputs. Because the same logic inputs are provided to three magnetoresistive sensing elements in each logic gate, these elements are given the same reference numerals 14X, 14Y, and 14$C_{in}$. The remaining sensing element in logic gate 12B is designated 14$\overline{C}_o$. Since input $\overline{C}_o$ is to be weighted 2, magnetoresistive sensing element 14$\overline{C}_o$ has a length twice that of the other magnetoresistive sensing elements. Its width and thickness are the same as the other elements. This means that the voltage developed across sensing element 14$\overline{C}_o$ will be twice that developed across the other magnetoresistive sensing elements.

Logic gates 12A and 12B are provided with measuring currents $I_{SA}$ and $I_{SB}$ through conductors 15A, 15B, respectively, by current generators 28A and 28B. These generators can provide current of variable magnitude in order to vary the total voltage output of each logic gate 12A and 12B. Current $I_{SA}$ appears prior to current $I_{SB}$ since inputs X, Y, $C_{in}$ are sensed by gate 12A prior to being sensed by gate 12B. After being sensed by gate 12B, current $I_c$ is provided to collapse the domains.

The voltage change $V_{SA}$ developed across logic gate 12A is applied to the first detection means 24A. This detection means has a threshold of 2 which means that if at least two of the three logic inputs X, Y, and $C_{in}$ are present, a binary 1 output $C_o$ will appear. This signal $C_o$ is applied to signal $\overline{C}_o$ control 18$\overline{C}_o$ to produce the inverted signal $\overline{C}_o$ and is also applied to the next stage of the adder if another stage is present.

The voltage $V_{SB}$ developed across logic gate 12B is applied to second detection means 24B. The threshold T' of detection means 24B is 3. If this theshold is exceeded by the voltage $V_{SB}$, a binary 1 will be obtained for the sum output of the adder circuit. In FIG. 5, electrical leads which cross over one another are separated by a layer of insulation, in a conventional manner.

The various current generators and magnetic field means of FIG. 5 operate under control of control means 40. Control means 40 activates propagation field means 30 and bias field means 32. In addition, control means 40 activates current generators 28A and 28B and collapse current source 34.

Thus, a full adder circuit has been provided using threshold logic devices with magnetic bubble domain inputs. Since the magnetoresistive sensing elements 14 are deposited on the magnetic sheet 10 at the same time, these elements can be fabricated to within close tolerances and therefore the device will track well. In addition, high speed operation results, and microstructures can be provided.

Figure 6:
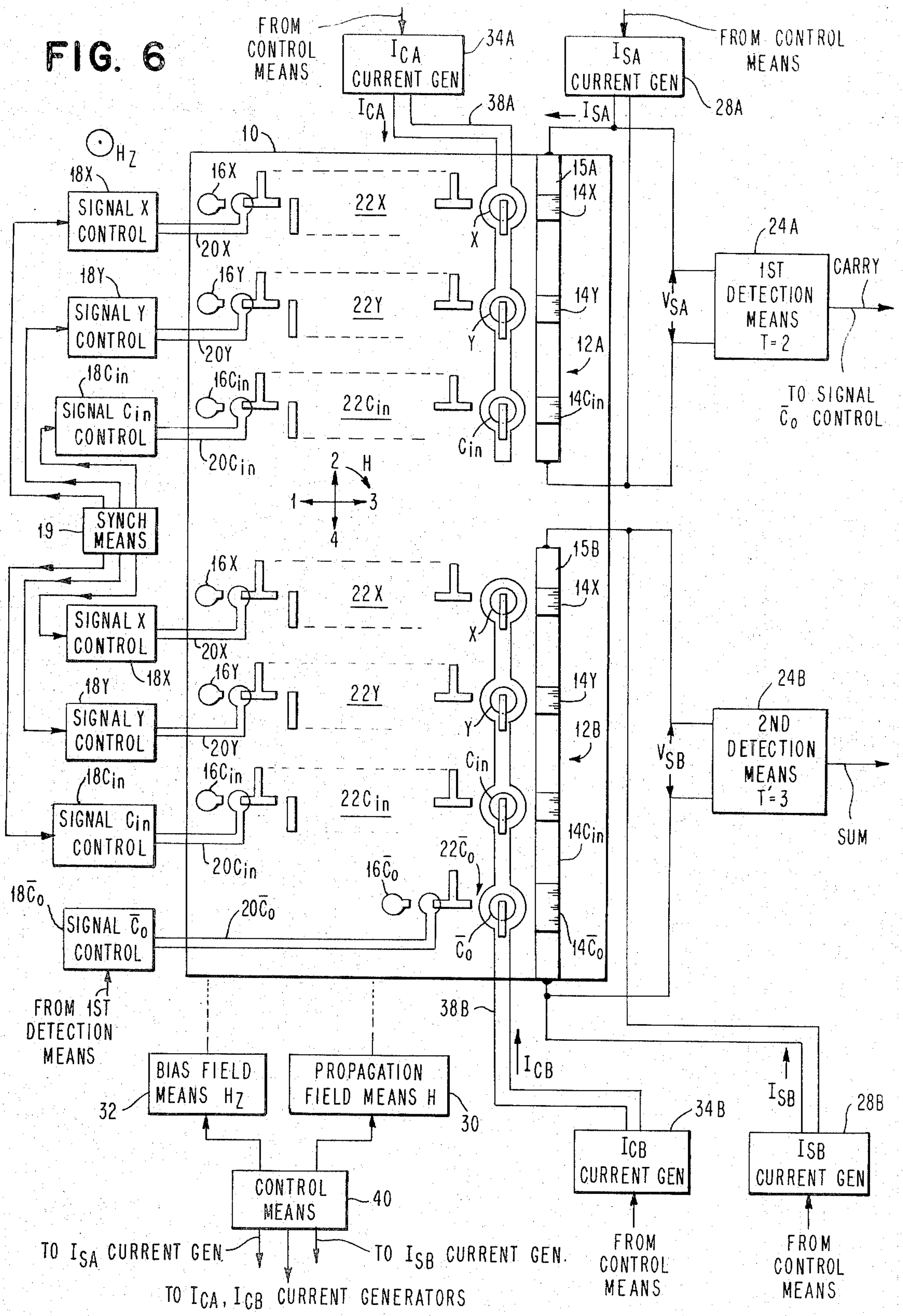
FIG. 6 is a second embodiment of the adder circuit of FIG. 4 using magnetic bubble domains.

FIG. 6 shows another embodiment of the adder circuit of FIG. 4. The embodiment of FIG. 6 differs from that of FIG. 5 in that the logic inputs X, Y, and $C_{in}$ are each generated by two domain generators to provide separate inputs for each logic gate 12A–12B. This embodiment has a disadvantage in respect to that of FIG. 5 in that extra domain generators and propagation means are required.

The embodiment of FIG. 6 will now be described and the same reference numerals as used throughout this application will be used here whenever possible. Further, it should be understood that the basic operation of the circuit in FIG. 6 is the same as that in FIG. 5. Consequently, this circuit will be described in less detail.

In FIG. 6, duplicate sets of the logic inputs X, Y, and $C_{in}$ are provided by duplicate sets of domain generators 16X, 16Y, and 16$C_{in}$, which are located on magnetic sheet 10. Associated with these two sets of domain generators are two sets of signal control means 18X, 18Y, and 18$C_{in}$. The signal control means 18X, 18Y and 18$C_{in}$ are connected to synchronization means 19 which insures that these logic inputs X, Y, and $C_{in}$ are delivered to gate 12A at the same time. Also, synch means 19 insures that logic inputs X, Y, and $C_{in}$ are delivered to gate 12B at the same time that input $\overline{C}_o$ arrives at gate 12B. This means that inputs X, Y, $C_{in}$ arrive at gate 12B after they arrive at gate 12A, in order that input $\overline{C}_o$ be present at gate 12B at the same time. Connected to the two sets of signal control means 18X, 18Y and 18$C_{in}$ are conductor loops 20X, 20Y, and 20$C_{in}$. All of the circuit components described thus far operate in identical fashion to their counterparts in FIG. 5.

The logic input $\overline{C}_o$ to logic gate 12A is provided by domain generator 16$\overline{C}_o$ which has associated with it a signal $\overline{C}_o$ control means 18$\overline{C}_o$. Means 18$\overline{C}_o$ provides a current in conductor loop 20$\overline{C}_o$ to create magnetic fields for collapse of domains produced by generator 16$\overline{C}_o$ when a binary 0 input is required. As was the case in FIG. 5, generator 16 $\overline{C}_o$ is located near gate 12B to insure that input $\overline{C}_o$ arrives at gate 12B simultaneously with inputs X, Y, and $C_{in}$.

Associated with the various domain generators are propagation means 22X, 22Y, 22$C_{in}$ and 22$\overline{C}_o$. These propagation means are shown as permalloy T and I bars which create attractive magnetic poles in response to the rotating, inplane magnetic field H. The various propagation means cause the bubble domain logic inputs to be brought into flux-coupling proximity to the logic gates 12A and 12B.

Logic gates 12A and 12B are comprised of series connected sensing elements, such as magnetoresistive sensing elements. Logic gate 12A is comprised of sensing elements 14X, 14Y, and 14$C_{in}$, while logic gate 12B is comprised of sensing elements 14X, 14Y, 14$C_{in}$ and 14$C_o$.

Current $I_{SA}$ flows through logic gate 12A prior to the flow of current $I_{SB}$ through logic gate 12B. These currents are produced by current generators 28A and 28B, respectively. The voltage change which develops across logic gate 12A when logical inputs are provided in flux-coupling proximity to this gate is $V_{SA}$. This voltage is provided to first detection means 24A which has an internal threshold of 2. If the voltage $V_{SA}$ is at least 2, a binary 1 output will be provided by the signal $C_o$.

The voltage developed across logic gate 12B when logic inputs are present in flux-coupling proximity to gate 12B is $V_{SB}$. This voltage is applied to the second detection means 24B, which has an internal threshold of 3. The binary output of detection means 24B is the sum of the circuit.

Each logic gate 12A and 12B has associated therewith a means for collapsing the bubble domain logic inputs after the sensing operation (for gates 12A and 12B) have occurred. In the case of logic gate 12A, current generator 34A provides current $I_{CA}$ through conductor loop 38A to collapse domains after they are sensed by the sensing elements of logic gate 12A. Correspondingly, current generator 34B provides current $I_{CB}$ through conductor loop 38B to collapse the magnetic bubble domain logic inputs to logic gate 12B, after they are sensed by this gate.

A control means 40 provides clock pulses to synchronize the operation of the propagation field means 30 and the bias field means 32. Control means 40 also synchronizes the operation of current generators 28A, 28B, 34A, and 34B. This insures that the bubble domain logic inputs will be sensed at the proper time and will be collapsed after the sensing operation.

In logic gate 12B, sensing element 14$\overline{C}_o$ is a magnetoresistive sensing element having a length twice that of the other magnetoresistive sensing elements. This means that the voltage developed across element 14$\overline{C}_o$ will be twice that developed across the other sensing elements, thereby providing a weighting factor of 2 for logical input $C_o$.

The circuitry shown in FIGS. 2, 5, and 6 is easily fabricated using conventional evaporation and etching techniques. For instance, magnetoresistive sensing elements can be evaporated onto magnetic sheet 10 through pattern deposition masks, after which additional masks can be used to deposit the propagation means 22. Permalloy domain generators 16 can also be evaporated onto sheet 10. The conductor patterns can be evaporated through masks and can be comprised of copper or gold.

The signal control means are standard electrical circuits and the detection means are standard threshold detectors responsive to the analog voltages developed across the various logic gates.

What has been described is a new type of magnetic bubble domain logic device which does not require interaction between bubble domains. Although magnetoresistive sensing elements are shown, other types of elements can be used. For instance, conductor loops having various loop areas can be used to sense the domains, and the signals developed will be in accordance with the area of the loops. Generally, it is preferable to use series connected elements, since the weighting functions and the threshold can then be easily established and varied in a controlled manner.

What is claimed is:

1. A threshold logic device using magnetic bubble domains, comprising:

a magnetic sheet in which said domains exist, said domains being logic inputs in said devices, a logic gate responsive to the simultaneous presentation of domains thereto, said gate being comprised of a plurality of sensing elements each of which is responsive to the magnetic field associated with a different logic input, said sensing elements providing output signals indicative of said bubble domain logic inputs, said output signals being weighted by said logic gate in accordance with the properties of said sensing elements and combined to provide a gate output signal, a detection means having an internal threshold, said detection means being responsive to said gate output signal for providing outputs depending on the magnitude of said output signal in relation to said threshold.

2. The device of claim 1, where said sensing elements are series connected.

3. The device of claim 1, where said sensing elements are magnetoresistive elements, each of which has a geometry and thickness in accordance with the weight to be assigned to its associated bubble domain logic input.

4. The device of claim 1, further including a second threshold logic device having bubble domain generating means associated therewith, said generating means being responsive to the binary output of said detection means for controlling the presence and absence of bubble domain logic input to said second threshold device.

5. A threshold logic device using magnetic bubble domains, comprising:

a magnetic sheet in which said domains exist, said domains being the logic inputs to said device, a logic gate responsive to said logic inputs for developing a gate output, said gate providing weighted signals in response to each said input wherein the output of said gate is the combination of said weighted signals, said gate being comprised of a plurality of sensing elements each of which is responsive to the stray magnetic field of a logic input for developing a weighted signal which is combined with other similarly developed weighted signals to produce said gate output, detection means having a decision threshold, said detection means being responsive to the output of said logic gate and providing different outputs depending upon whether said threshold is exceeded by said logic gate output.

6. The device of claim 5, where said sensing elements are magnetoresistive sensing elements, there being current provided through said elements by an electrical means series connected with said elements.

7. The device of claim 6, where the geometry of selected magnetoresistive elements is different than that of other magnetoresistive elements to provide different weighting factors for said selected elements.

8. The device of claim 6, where the thickness of selected magnetoresistive sensing elements is different than that of other magnetoresistive elements to provide different weighting factors for said selected elements.

9. The device of claim 6, where all of said magnetoresistive elements have the same thickness and geometry, thereby providing equal weighting factors for all domain logic inputs.

10. The device of claim 5, where said magnetoresistive elements are located in flux-coupling proximity to said bubble domain logic inputs and develop electrical signals when the stray magnetic fields of said domains intercept said magnetoresistive elements, the electrical signals developed by each magnetoresistive element being combined to provide said logic gate output which is the input to said detection means.

11. The device of claim 5, further including propagation means associated with said magnetic sheet for moving said bubble domain logic inputs to positions of flux-coupling proximity to said sensing elements.

12. The device of claim 5, further including collapse means for collapsing said domains after they are sensed by said sensing elements.

13. A threshold logic device using the presence and absence of magnetic bubble domains as logic inputs thereto, comprising:

a magnetic sheet in which said domains exist, a logic gate comprised of a plurality of series connected magnetoresistive sensing elements, each of which is responsive to a bubble domain logic input to provide an electrical output indicative of the presence and absence of said domains, said sensing elements having physical properties which determine the magnitude of the electrical output of each said magnetoresistive sensing element, electrical means for providing current through said magnetoresistive sensing elements, detection means responsive to a combination of electrical outputs of said magnetoresistive sensing elements, said detection means having a threshold associated therewith and providing a particular output depending upon the magnitude of said combination of electrical outputs of said sensing elements in comparison to said threshold.

14. The device of claim 13, where said bubble domain logic inputs are simultaneously sensed by said magnetoresistive sensing elements.

15. The device of claim 13, further including input means for providing bubble domain logic inputs to said logic gate.

16. The device of claim 15, where said input means includes propagation means for moving said domains into flux-coupling proximity to said magnetoresistive sensing elements.

17. The device of claim 13, where said magnetoresistive elements have identical thickness and geometry.

18. The device of claim 13, where selected magnetoresistive elements have different thicknesses from other magnetoresistive elements whereby said selected magnetoresistive elements provide different electrical outputs than the other magnetoresistive elements.

19. The device of claim 13, where selected magnetoresistive elements have different geometries than other magnetoresistive elements whereby said selected magnetoresistive elements provide different electrical outputs than the other magnetoresistive elements.

20. The device of claim 13, further including at least one other threshold logic device and a bubble domain generating means associated with said other logic device for providing a logic input to said other device, said bubble domain generating means being controlled by the binary output of said detection means.

21. The device of claim 13, where said electrical means is a current generator, the electrical signals being developed by said magnetoresistive elements being voltage signals produced in accordance with the bubble domain logic inputs to said magnetoresistive elements.

22. The device of claim 13, where said electrical means is a voltage source, the electrical signals being developed by said magnetoresistive elements being current signals produced in accordance with the bubble domain logic inputs to said magnetoresistive elements.

23. The device of claim 13, where said magnetoresistive elements are comprised of nickel and iron.

24. The device of claim 13, further including collapse means for destroying said domains after being sensed by said magnetoresistive sensing elements.

25. The device of claim 24, further including control means for sequencing said collapse means after said domains are sensed.

26. A threshold logic device for magnetic bubble domains, comprising:

a magnetic medium in which said domains can exist, said domains representing logical inputs to said device, a logic means responsive to the presentation of said logic inputs thereto, including means for providing outputs weighted in accordance with said bubble domain inputs, and detection means having a decision threshold responsive to said weighted outputs from said logic means for providing signals in accordance with said decision threshold.

27. The device of claim 26, where said logic means is comprised of sensing elements for providing electrical signals representative of the presentation of logic inputs thereto.

28. The logic device of claim 27, where said sensing elements are comprised of magnetoresistive sensing elements.

* * * * *